United States Patent
Sekar

(10) Patent No.: US 11,003,481 B2
(45) Date of Patent: May 11, 2021

(54) SYSTEM AND METHOD FOR AN EFFICIENT AND SCALABLE MULTITENANT DATABASE IMPLEMENTATION FOR SERVICES PLATFORMS, INCLUDING CLOUD SERVICES PLATFORMS

(71) Applicant: OPEN TEXT CORPORATION, Waterloo (CA)

(72) Inventor: Dhatchana Moorthy Sekar, Bangalore (IN)

(73) Assignee: OPEN TEXT CORPORATION, Waterloo (CA)

(*) Notice: Subject to any disclaimer, the term of this patent is extended or adjusted under 35 U.S.C. 154(b) by 45 days.

(21) Appl. No.: 16/438,708

(22) Filed: Jun. 12, 2019

(65) Prior Publication Data

US 2020/0394061 A1  Dec. 17, 2020

(51) Int. Cl.
G06F 9/46 (2006.01)
G06F 9/455 (2018.01)
G06F 16/21 (2019.01)

(52) U.S. Cl.
CPC ........ *G06F 9/45558* (2013.01); *G06F 16/213* (2019.01); G06F 2009/45562 (2013.01); G06F 2009/45587 (2013.01)

(58) Field of Classification Search
None
See application file for complete search history.

*Primary Examiner* — Gregory A Kessler
(74) *Attorney, Agent, or Firm* — Sprinkle IP Law Group

(57) ABSTRACT

Embodiments of a services application on web services platform that employs embodiments of a database architecture for use in multitenant environments that replicates the same schema in the context of a database are disclosed. These schemas can be accessed using a database access object corresponding to the database and a particular schema for a particular tenant. In particular, the object identifier used to access the objects of the schema may be algorithmically generated based on the tenant.

18 Claims, 6 Drawing Sheets

SYSTEM AND METHOD FOR AN EFFICIENT AND SCALABLE MULTITENANT DATABASE IMPLEMENTATION FOR SERVICES PLATFORMS, INCLUDING CLOUD SERVICES PLATFORMS

TECHNICAL FIELD

This disclosure relates generally to data storage. Even more specifically, this disclosure relates to data storage systems for use with services platforms that may serve multiple tenants. Even more specifically, this disclosure relates to efficient and scalable data storage systems for use with services platforms that serve multiple tenants and may be deployed, for example, as cloud services.

BACKGROUND

An emerging information technology (IT) delivery model is web services model, by which shared resources, software or information are provided over a network such as the Internet to computers and other devices on-demand. Many times such web services are provided in the context of cloud computing. A cloud computing service generally refers to a service that allows end recipient computer systems (thin clients, portable computers, smartphones, desktop computers and so forth) to access a pool of hosted computing or storage resources (i.e., the cloud resources) over a network (the Internet, for example). In this manner, the host, a cloud service, may, as examples, provide Software as a Service (SaaS) by hosting applications; Infrastructure as a Service (IaaS) by hosting equipment (servers, storage components, network components, etc.); or a Platform as a Service (PaaS) by hosting a computing platform (operating system, hardware, storage, etc.).

Cloud computing resources are typically housed in large server farms that run networked applications, typically using a virtualized architecture wherein applications run inside virtual servers, or so-called "virtual machines" (VMs), that are mapped onto physical servers in a data center facility.

One key characteristic of web services and cloud computing that is different from existing environments is the desire for so-called "multitenant" support, sometimes referred to as multitenant single deployment. To satisfy this requirement, service providers have to be able to isolate different usage of the services. Indeed, typically one of the most significant barriers keeping enterprises or organizations from utilizing such services resources are security related. In particular, shared environments have the potential to expose unprotected data to malicious attacks, hacking, and introspection by third parties, both intentional and otherwise. The service provider thus needs to maintain isolation between and among their specific users that are sharing resources.

This has proved problematic as many of the existing pieces of infrastructure used to create these web services and cloud computing platforms were not designed to work with or accommodate the demands of such multitenant support.

What is needed therefore are implementations of multitenant web services that allow isolation of data between tenants while remaining efficient, powerful, portable and simple.

SUMMARY

To those ends, among others, embodiments as disclosed herein may provide a services application deployed on as services platform that employs embodiments of a database architecture for use in multitenant environments that replicates the same schema in the context of a database. These schemas can be accessed using a database access object corresponding to the database and a particular schema for a particular tenant. In particular, the objectid used to access the objects of the schema may be algorithmically generated based on the tenant. Specifically, an objectid may be a compound key generated based on the particular user or tenant associated with the user and a range of numbers (e.g., which may be associated with a tenant).

In one embodiment, a web services system may include a multitenant web services application deployed on a web services platform and a database layer, comprising a database. The web services application may operate by establishing a first schema in the database for a first tenant of the web services application and establishing a second schema in the database for a second tenant of the web services application, wherein the first schema is a replica of the second schema. In response to receiving a first request from a first user at a first client application the web services application may determine that the first request is associated with the first tenant, and based on this determination establish a first session at the web service application associated with the first client application, establish a first database connection object configured to access the first schema of the database, and associate the first database connection object with the first user session.

In response to receiving a second request from a second user at a second client application the web services application may determine that the second request is associated with the second tenant, and based on this determination establish a second session at the web service application associated with the second client application, establish a second database connection object configured to access the second schema of the database, and associate the second database connection object with the second user session.

The web services application can receive a third request and determine if the third request is associated with the first tenant or the second tenant. Based on a determination that the third request is associated with the first tenant, the web services application can perform the third request by accessing the first schema in the database associated with the first tenant using the first session and first database connection object associated with the first schema. Based on a determination that the third request is associated with the second tenant, the web services application can perform the third request by accessing the second schema in the database associated with the second tenant using the second session and second database connection object associated with the second schema.

In a particular embodiment, determining that the first request is associated with the first tenant comprises determining that the first user of the first client application is associated with the first tenant using user authentication credentials for the first user.

In a specific embodiment, the third request is a request to create an object and the web services application may establish a first range of sequence numbers associated with the first tenant and a second range of sequence numbers associated with the second tenant, and create an object identifier for the object, where the object identifier includes a number in the first range of sequence numbers when it is determined that the third request is associated with the first tenant and the object identifier includes a number in the second range of sequence numbers when it is determined that the second request is associated with the second tenant.

In one embodiment, determining if the third request is associated with the first tenant or the second tenant is based on user credentials associated with the third request.

In some embodiments, the first user session includes a first identifier for the first tenant and the second user session includes a second identifier for the second tenant and determining if the third request is associated with the first tenant or the second tenant comprises associating the third request with the first user session or the second session.

Accordingly, embodiments as disclosed herein may provide a number of advantages. For example, embodiments may allow the same schema for use with a multitenant services platform to be replicated in the context of a database (e.g., a single database) without substantial modifications to the services platform (e.g., to function similarly to services platform as implemented in a single tenant environment) while still ensuring the security of the data of each tenant. Such capabilities may, in turn, allow web services application to be implemented in a more efficient manner that may consume fewer computing resources, including processor cycles, memory or other storage resources (e.g., database resources).

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
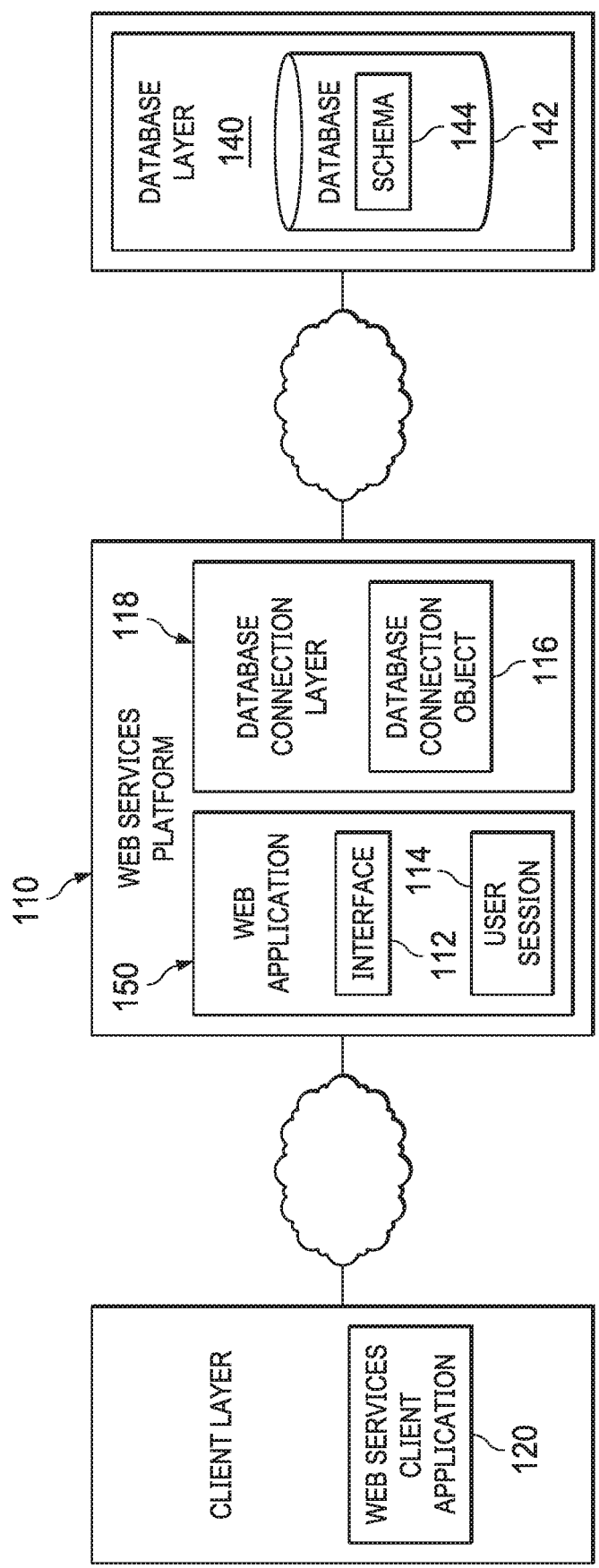
FIG. 1 is a diagrammatic representation of a computing architecture including a web services platform.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before delving into embodiments in more detail, some brief context may be useful. An emerging information technology (IT) delivery model is cloud computing, by which shared resources, software or information are provided over a network such as the Internet to computers and other devices on-demand. When multiple parties share resources within a cloud computing and other such shared deployment model, a compelling transformation and reduction in their IT costs (from fixed to variable) can be achieved. Using this approach, entities can extend computing and storage capacity elastically to match demand, shift operational and capital costs to an external data center, free IT staff to focus on new projects, and more.

Cloud compute resources are typically housed in large server farms that run networked applications, typically using a virtualized architecture wherein applications run inside virtual servers, or so-called "virtual machines" (VMs), that are mapped onto physical servers in a data center facility.

One key characteristic of cloud computing that is different from existing environments is the requirement for so-called "multitenant" support, sometimes referred to as multi-customer single deployment. To satisfy this requirement, service providers have to be able to isolate different customer usage of the cloud services. Indeed, typically one of the most significant barriers keeping an enterprise customer from utilizing such resources is the ability to gauge a provider's security posture in relation to its own security compliance requirements. In particular, shared environments have the potential to expose unprotected data to malicious attacks, hacking, and introspection by third parties, both intentional and otherwise. The service provider thus needs to maintain isolation between and among their specific customers that are sharing cloud resources. Thus, such systems need to ensure end-to-end trust and security of customer data regardless of their underlying networks, platforms, virtualization mechanism or middleware.

This has proved problematic as many of the existing pieces of infrastructure used to create these cloud services platforms were not designed to work with or accommodate the demands of such multitenant support. In particular, most data storage systems, including databases, were not designed or architected for use in such multitenant services platforms. It will prove useful here to discuss the typical use of an implementation of data storage systems in the context of services platform. While descriptions here, and throughout, will be described using services platforms that are deployed in the cloud (e.g., cloud services or cloud services platforms) and databases, it should be noted here that in the context of descriptions of embodiments as presented herein, the term database will be used to apply generally to data storage systems, and the terms cloud platform or cloud services platform will be used to apply generally to any service platform though which software or functionality is offered through an interface, regardless of whether such software or functionality is deployed in a cloud computing environment or otherwise.

Turning then to FIG. 1, a depiction of a architecture for the deployment of services in a cloud platform is depicted. Here, a web services platform 110 provides a web application 150 that may be accessed through an interface 112, which may be a REpresentational State Transfer (REST) or the like. The web services platform 110 may be implemented using a proprietary server or servers (e.g., owned or maintained by the providers of the web service platform 110) or may be executing on third party platform such as a cloud computing platform or the like.

Thus, various client applications 120 (usually remote) in a client layer 122 may request services offered by web application 150 using the web services interface 112 offered by the web services application 150. In some cases these client applications 120 may be proprietary client applications executing on a user client's computing device associated with, or provided by, the provider of the web services application 150 or may be browser based interfaces provided by the provider of the web services application 150. For example, a user at a client device may access a certain location (e.g., Universal Resource Locator (URL)) associated with the web services application 150 using a browser and a browser based application for accessing the web application 150 may be provided.

As the user interacts with the client application 120, requests for various web services provided by the web services platform 110 may be sent by the client application 120, received through the web services interface 112, and the web application 150 may take appropriate actions.

In many cases, the web application 150 requires data storage and management to implement the functionality of the platform. Accordingly web services platforms 110 may include, or access a database (DB) layer 140 used for such data storage and data management. This database layer 140 may be a database cluster as are known in the art. An example of such a database is Postgres or the like.

Thus, the web services application 150 may have a corresponding database 142 defined in the database layer 140 and a corresponding schema 144 defined in the database 142. The schema 144 is a container or namespace within the database 142 that may include a set of tables, views, stored procedures or triggers.

Accordingly, in most cases, when a web services application 120 establishes a user session 114 for that user and application 120 at the web services platform that user session 114 is linked with a database connection object 116 in a database connection layer 118 that is configured for accessing the particular instance of the database 142 having a particular schema 144. When the web services client application 120 submits a request that requires access to the database, the request is received by the web application 150 and linked with the user session 114 and thus the corresponding database connection object 116. The web application can thus access the proper schema 144 in the appropriate database 142 for performing any needed operations to accomplish the request.

Such an architecture may be perfectly adequate in cases where client applications 120 are all associated or affiliated with a single entity or tenant (e.g., any defined grouping of users of a web application, such as entity, business, organization, non-profit, department, etc.). All instances of a client application 120 are associated with that tenant and may communicate with the web application 150 and access data in schema 144 of the database 142.

In many cases, however, the providers of the web application 150 may desire to use the web application 150 with multiple tenants. The use of a web application in a multi-tenant environment is, however, problematic, especially with regards to the access and storage of the data of these tenants. If all data from the multiple tenants is stored in the same schema 144 security is compromised. Each tenant may have access to the data of the other tenants, a completely untenable situation.

One possibility to ameliorate this situation is to attempt to use partitions within the schema 144 or database 142. This solution is problematic for another reason: to implement such a solution would require altering the queries to the database 142 and the implementation (e.g., computer executable instructions or code) of the web application 150 itself, as partitions must usually be determined and added to queries.

Figure 2:
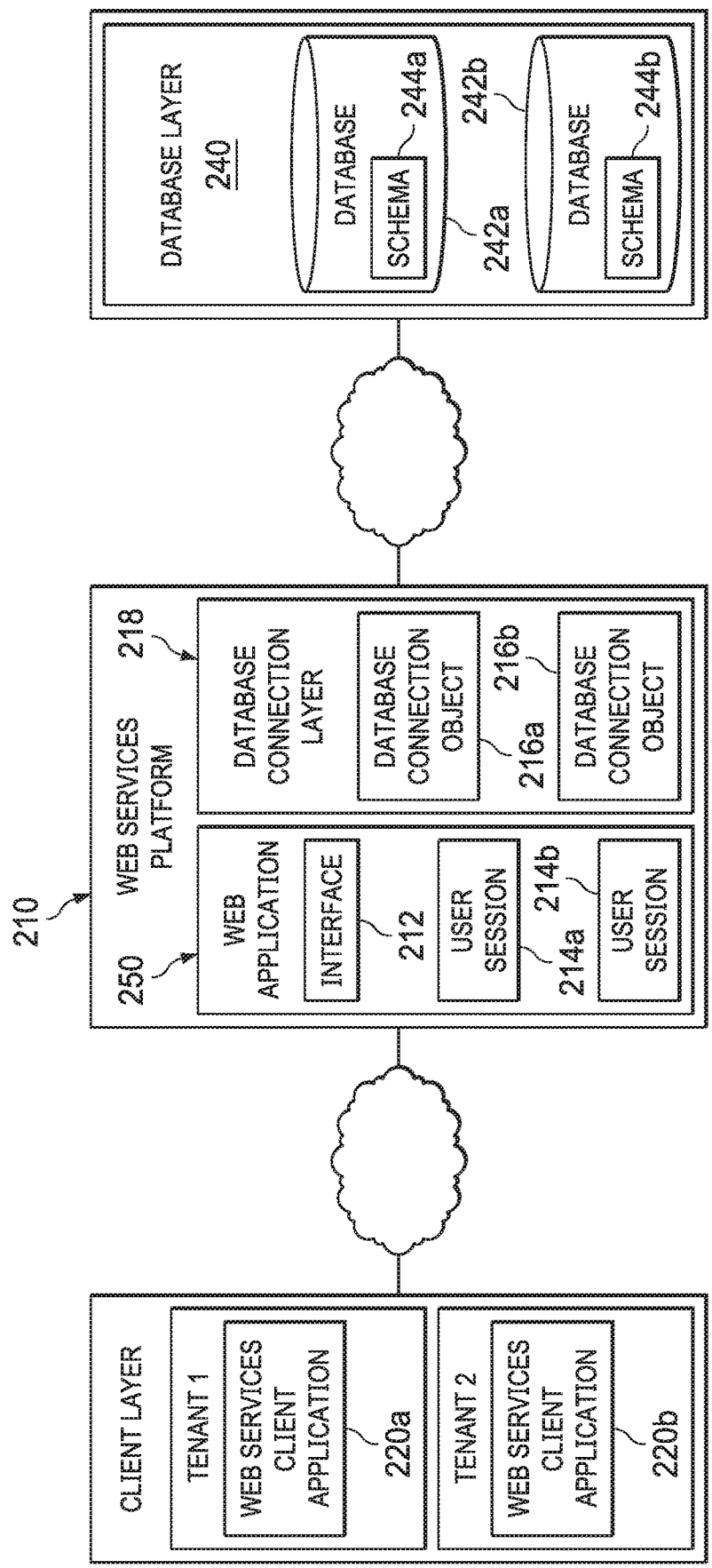
FIG. 2 is a diagrammatic representation of a computing architecture including a web services platform.

Another possibility to accommodate the provisioning of multiple tenants for a web application is to utilize multiple databases, where each database is associated with one of the tenants. This arrangement is depicted in FIG. 2. In this implementation, a web services platform 210 provides a web application 250 that may be accessed through an interface 212 by web client applications 220 associated with multiple tenants. In other words, multiple users associated with multiple tenants may each utilize the services provided through the web application 250 using client applications 220. For example, as depicted, a first web client application 220a for a user associated with a first tenant may interact with the web application 250 while a second web client application 220b for a user associated with a second tenant may also interact with the web application 250.

Thus, the client applications 220 associated with different tenants in a client layer 222 may request services offered by web application 250 using the web services interface 212 offered by the web services application 150. Here, web services platforms 210 may include, or access a database (DB) layer 220 used for such data storage and data management where there is a database 242 defined or otherwise configured for each tenant of the web application 250, where each database 242 has a corresponding schema 244 defined in the respective database 242. For example, as depicted database 242a and schema 244a may be associated with the first tenant of web application 250 and database 242b and schema 244b may be associated with the second tenant of web application 250.

Accordingly, in most cases, when a web services client application 220 establishes a user session 214 for that user and application 220 at the web services platform 210 that user session 214 is linked with a database connection object 216 in database connection layer 218 that is configured for accessing the particular instance of the database 242 for the tenant associated with the user and client application 220. Again, here user session 214a and database connection object 216a are associated with client application 220a associated with the first tenant and database 242a while user session 214b and database connection object 216b are associated with client application 220b associated with the second tenant and database 242b.

When a web services client application 220 submits a request that requires access to a database 242, the request is received by the web application 250, the tenant associated with that user and client application is determined. The client application can then be linked with the user session 214 for the appropriate tenant and thus the corresponding appropriate database connection object 216. The web application can thus access the schema 244 in the appropriate database 242 (e.g., associated with the proper tenant) for performing any needed operations to accomplish the request.

While this arrangement may serve to isolate data from different tenants by virtue of having them reside in different databases in the database layer, this solution is somewhat problematic as well. Specifically, this architecture may result in a great deal of wasted infrastructure. This wasted infrastructure results in no small part from the need to establish the supporting infrastructure for each instance of an implemented database, including, for example, fail over processes or hardware, cluster and namespace management or data, load balancing services, or other infrastructure requirements needed or desired for an instance of a database within the database layer. Moreover, not only does this saturation result in wasted infrastructure but additionally, the setup may be time consuming and costly, both during initial setup and during any requirement maintenance, as patches and software updates and the like may need to be applied across all instances or deployments of the database or associated hardware or software.

What is desired is an efficient and simple implementation of data storage for multitenant web services (or other types of) applications that allows isolation of data between tenants without substantial re-factoring of the code or implementation of the web services application and can replicate the same schema across all the tenant.

To that end, embodiments as disclosed herein may provide a services platform that employs embodiments of a database architecture for use in multitenant environments that replicates the same schema in the context of a database. These schemas can be accessed using a database access object corresponding to the database and a particular schema for a particular tenant. In particular, the primary key or objectid (used interchangeably herein) used to access the objects of the schema may be algorithmically generated based on the tenant. Specifically, an objectid may be a compound key generated based on the particular user or tenant associated with the user and a range of numbers (e.g., which may be associated with a tenant).

Thus, when a tenant for a web application is created, a new schema may be created in the database, where the schema may replicate a schema associated with the web application. When a request to store or create an object in the database is received from a user with the client application is received at a web application, the tenant associated with the request may be determined. The identification of the tenant may be performed, for example, using an identifier associated with the user such as authentication credentials or an email address or another type of user identifier. This user identifier may be used in association with an authentication or directory service such as OpenText Directory Service (OTDS) or Active Directory or Lightweight Directory Access Protocol (LDAP) server to determine the tenant associated with the user.

The identified tenant can be utilized to determine an associated range of sequence numbers specific to the tenant and the next number in the sequence not yet assigned to an object may be determined. The primary key or objectid for the new object can be created by combining a reference to the database utilized by the web application and the determined sequence number. A user session associated with the user and client application can be associated with a database connection object associated with the schema of the database associated with the tenant and the request performed with respect to the schema associated with the tenant using database connection object and the created objectid.

When a request for a particular object (e.g., as identified by an objectid in the request) the user session object associated with the user can be used to identify the database connection object associated with the schema of the database associated with the tenant, and the request performed with respect to the schema associated with the tenant using the database connection object and the received objectid.

In this manner, embodiments may allow the same schema for use with a multitenant services platform to be replicated in the context of a database (e.g., a single database) without substantial modifications to the services platform (e.g., to function similarly to services platform as implemented in a single tenant environment) while still ensuring the security of the data of each tenant.

Figure 3:
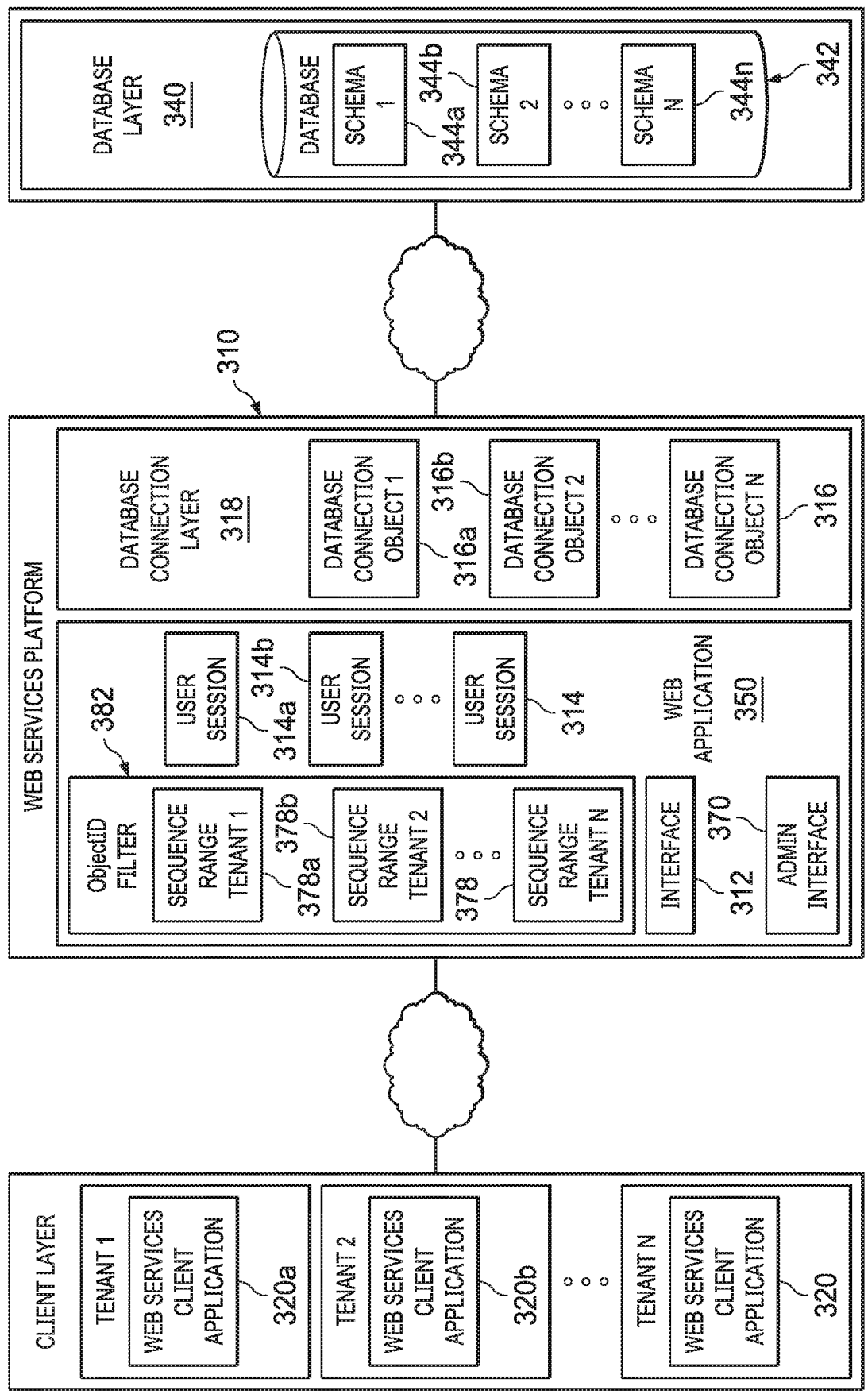
FIG. 3 is a diagrammatic representation of a computing architecture including one embodiment of web application on a web services platform.

Looking then at FIG. 3, an example topology including an embodiment of a multitenant services platform that employs embodiments of a database architecture with replicated schemas is depicted. In the implementation of this embodiment, a web application 350 is provided on a web services platform 310 where the web application 350 may be accessed through an interface 312 by web client applications 320 associated with multiple tenants. Examples of such web services applications may be Documentum Web Services or Content Server Web Services by OpenText Corporation.

The web services platform 310 may be implemented using a proprietary server or servers (e.g., owned or maintained by the providers of the web service platform 310) or may be executing on third party platform such as a cloud computing platform or the like. Web services platform 310 may also include, or access a database layer 340 used for data storage and data management. This database layer 340 may be a database cluster as are known in the art. An example of such a database is Postgres or the like.

Thus, the web services application 350 may have a corresponding database (also referred to as a docbase) 342 defined in the database layer 340 and utilize one or more corresponding schemas 344 defined in the database 342. The schema 344 is a container or namespace within the database 342 that may include a set of tables, views, stored procedures or triggers. Each of the schemas 344 may be a replica of the same schema in the same database 342. Thus, each schema 344 may be different container or namespace that includes the same set of tables, views, stored procedures or triggers (but which may include different data in those tables, views, stored procedures or triggers).

Specifically, when a tenant is given access to use of web application 350 (e.g., when users of a tenant are given access to the web application 350 or the ability to use web services client applications 320) a replica of schema 344 may be created in database 342 corresponding to that tenant. Thus, a corresponding schema 344 is established for each tenant given access to, or permission to use, web application 350, where each of these schemas 344 are replicas of one another. For example, as depicted, schema 344a may be established in database 342 for tenant 1, schema 344b may be established for tenant 2, schema 344n may be established for tenant n, and the like.

To facilitate the creation of this schema 344 web application 350 may include administrative interface 370. This administrative interface may for example a REST interface that can be used by administrative client application for the managing and monitoring of database layer 340 and, in particular, databases 342 and tenant schemas 344 in these databases 342.

Accordingly, multiple users associated with multiple tenants may each utilize the services provided through the web application 350 using client applications 320. For example, as depicted, a first web client application 320a for a user associated with a first tenant (tenant 1) may interact with the web application 350 while a second web client application 320b for a user associated with a second tenant (tenant 2) may also interact with the web application 350.

When a particular web services client application 320 connects to the web application 350, a user session 314 for that user and application 320 can be established at the web services application 350. Moreover, that user session 314 is linked with a database connection object 316 in database connection layer 318 that is configured for accessing the particular instance of the schema 344 for the tenant associated with the user and client application 320. The user session 314 may also include an identification of the tenant associated with the user session 314.

In particular, according to an embodiment, when client application 320 attempts to access the web application 350, the user of the client application 320 may be authenticated. For example, the user may be asked to provide some form of authentication credentials including a user identifier such as a user name and password through an interface presented through the client application 320 or an email address and password, etc. Once the use is authenticated, a tenant associated with the user may be determined. This user identifier may be used in association with an authentication or directory service such as an OTDS or LDAP server to determine the tenant associated with the user.

Once the tenant associated with the user of the client application 320 is determined a database connection object 316 configured for accessing the schema 344 in database 342 corresponding to that determined tenant may be created or otherwise obtained and associated with the corresponding user session 314 for the user such that requests requiring access to database 342 received from that client application may be directed to the corresponding schema 344 in database 342 using that database connection object 316 for the user session 314. When a web services client application 320 subsequently submits a request that requires access to the database 342, the request is received by the web application 350, the user session 314 associated with that user and client application is determined and the web application 350 can access the appropriate schema 344 for the proper tenant for performing any needed operations to accomplish the request.

For example, as depicted, a first web client application 320a for a first user associated with the first tenant (tenant 1) may interact with the web application 350. Based on this interaction, web application 350 may determine the first user using that application 320a is associated with the first tenant, create user session 314a and database connection object 316a associated with the first tenant and first user and configured to access schema 344a in database 342 associated with the first tenant. Thus, when web services client application 320a subsequently submits a request that requires access to the database 342, the request is received by the web application 350, the user session 314a associated with the first user and client application is determined and the web application 350 can access the appropriate schema 344a for the first tenant using database connection object 316a linked to user session 314a for performing any needed operations to accomplish the request.

Similarly, a second web client application 320b for a second user associated with the second tenant (tenant 2) may interact with the web application 350. Based on this interaction, web application 350 may determine the second user using that application 320b is associated with the second tenant, create user session 314b and database connection object 316a associated with the second user and the second tenant and configured to access schema 344b in database 342 associated with the second tenant. Here web services client application 320b subsequently submits a request that requires access to the database 342, the request is received by the web application 350, the user session 314b associated with the second user and client application is determined and the web application 350 can access the appropriate schema 344b for the first tenant using database connection object 316b linked to user session 314b for performing any needed operations to accomplish the request.

Some of the requests submitted by the client application 320 may thus involve the creation of, or access to, objects within the database 342, and specifically objects defined with respect to the schema 344 defined in the database 342. In certain embodiments, the primary key used for these objects may be algorithmically generated based on the tenant. Specifically, an objectid for an object defined within schema 344 may be a compound key generated based on the particular user or tenant associated with the user and a range of numbers (e.g., which may be associated with a tenant). In one embodiment, such a compound key may include a portion that defines the type of object (e.g., the first two bytes of the key), a portion that defines the database 342 (or docbase) (e.g., six bytes) and a portion (e.g., eight bytes) that defines a sequence number or identifier for that particular object.

As the database 342 utilized for all tenants may be the same, and the identifiers for the types of objects may be the same (e.g., because the schema 344 is the same regardless of tenant), in order to generate unique keys for objects, the sequence numbers may be separated into ranges, and a particular sequence range assigned to a specific tenant.

In one embodiment, when a tenant is given access to use of web application 350 (e.g., when users of a tenant are given access to the web application 350 or the ability to use web services client applications 320) a sequence range of numbers 378 (e.g., 0 to 10,000,000, 10,000,001 to 20,000,000, etc.) may be assigned to each tenant and stored for use by web services application 350. These sequence ranges 378 may be algorithmically determined by web application 350 based on ranges 378 already assigned or available or may be made manually using, for example, administrative interface 370 at the time a tenant is established for web application 350. For example, as depicted, a first sequence range 378a is associated with the first tenant (tenant 1) while a second sequence range 378b is associated with the second tenant (tenant 2).

These sequence ranges may thus be used the generation of an objectid for an object created in the schema for a user associated with a particular tenant. To facilitate the generation of these objectids, web application 350 may include objectid filter 382. This objectid filter 382 may have access to each sequence range 378 for each tenant and be configured for creating an objectid for a particular tenant based on these sequence ranges 378.

Thus, when web application 350 receives a request to store or create an object in the database 342 from a client application 320 the objectid filter 382 may be utilized to create an objectid for this object. In some embodiments, when such a request is received the web application 350 may determine the tenant associated with the request. The identification of the tenant may be performed, for example, using an identifier associated with the user such as authentication credentials or an email address or another type of user identifier as discussed. The identification of the tenant may also be accomplished by referencing the user session 314 associated with the client application 320 which may include an identification of the tenant associated with the user and client application 320.

Objectid filter 378 may utilize the determined tenant to determine the associated sequence range 378 specific to the determined tenant and a following or next number in that sequence (e.g., which may be a sequential or non-sequential value) not yet assigned to an object may be determined. The primary key or objectid for the new object can be created based on the next sequence number. The objectid can thus include, or be based on or derived from, this next number in the sequence. For example, the objectid for the new object can be created by combining a reference to the database 342 utilized by the web application 350 and this determined sequence number. In one embodiment for instance, the objectid created may be a compound key including a portion that defines the type of object to be created (e.g., the first two bytes of the key), a portion that defines the database 342 (or docbase) (e.g., six bytes) and a portion (e.g., eight bytes) that defines the determined next sequence number or a derivative thereof. Other methods or algorithms or transformations for forming a unique objectid from a sequence number may be possible and are fully contemplated herein.

The received request can then be performed with respect to the schema 344 associated with the determined tenant using database connection object 316 associated with the user session 314 corresponding to the client application 320 from which the request was received and the created objectid. For example, an object with the determine objectid may be created in the schema 344 corresponding to the determined tenant.

For example, when web application 350 receives a request to store or create an object in the database 342 from client application 320a, the web application 350 may determine that the first tenant (tenant 1) is associated with this request. Objectid filter 378 may utilize the determined first tenant to determine the associated sequence range 378a specific to the determined first tenant and the next number in that sequence not yet assigned to an object may be determined. The objectid for the object can be created by combining a reference to the database 342 utilized by the web application 350 and this determined sequence number. The received request can then be performed with respect to the schema 344a associated with the first tenant using database connection object 316a associated with the user session 314a corresponding to the client application 320a from which the request was received, and the created objectid. For example, an object with the determine objectid may be created in the schema 344a corresponding to the first tenant.

Likewise, when web application 350 receives a request to store or create an object in the database 342 from client application 320b, the web application 350 may determine that the second tenant (tenant 2) is associated with this request. Objectid filter 378 may utilize the determined second tenant to determine the associated sequence range 378b specific to the second tenant and the next number in that sequence not yet assigned to an object may be determined. The objectid for the new object can be created by combining a reference to the database 342 utilized by the web application 350 and this determined sequence number. The received request can then be performed with respect to the schema 344b associated with the second tenant using database connection object 316b associated with the user session 314b corresponding to the client application 320b from which the request was received, and the created objectid. For example, an object with the determine objectid may be created in the schema 344b corresponding to the second tenant.

When a request for a particular object is subsequently received from a client application 320 (e.g., as identified by an objectid in the request) the user session 314 associated with the user and client application 320 can be used to identify the database connection object 316 associated with the schema 344 of the database 342 associated with the tenant, and the request performed with respect to the schema associated with the tenant using the database connection object and the received objectid.

In this manner, embodiments may allow the same schema for use with a multitenant services platform to be replicated in the context of a database (e.g., a single database) without substantial modifications to the services platform (e.g., to function similarly to services platform as implemented in a single tenant environment) while still ensuring the security of the data of each tenant.

Figure 4:
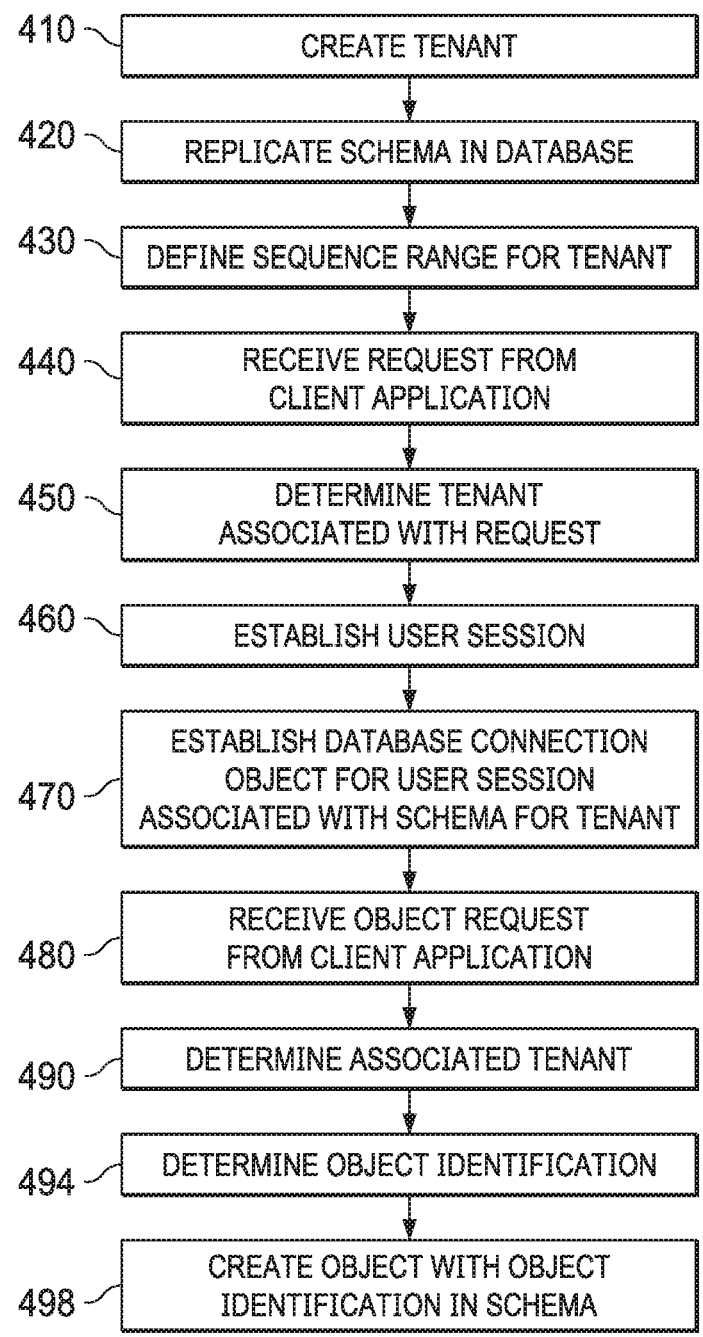
FIG. 4 depicts a diagrammatic representation of one embodiment of a method for operating a web services application on a web services platform.

Moving now to FIG. 4, one embodiment of a method for operating a web services application is depicted. Such a method may be utilized, for example, for operating a web services application deployed on a cloud computing platform. Initially, a tenant may be created for the web service (STEP 410). When the tenant is created a replica of the schema associated with the web service application may be created in a database associated with the web services application (STEP 420). Specifically, when a tenant is given access to use of web services application (e.g., when users of a tenant are given access to the web application or the ability to use web services client applications) a replica of the schema may be created in database corresponding to that tenant. Thus, a corresponding schema is established for each tenant given access to, or permission to use, web application where each of these schemas are replicas of one another.

Additionally, a sequence range of numbers for use in key generation may be defined for the tenant (STEP 430). As the database utilized for all tenants may be the same, and the identifiers for the types of objects may be the same (e.g., because the schema is the same regardless of tenant), in order to generate unique keys for objects, the sequence numbers may be separated into ranges, and a particular sequence range assigned to the created tenant.

In one embodiment, when a tenant is given access to use of web application a sequence range of numbers may be assigned to each tenant and stored for use by web services application. These sequence ranges may be algorithmically determined by the web services application, based on ranges already assigned or available, or may be made manually at the time a tenant is established for web services application. These sequence ranges may thus be used the generation of an objectid for an object created in the schema for a user associated with a particular tenant.

When an initial request or communication is received from a client application at the web services application (STEP 440) a tenant associated with the request can be determined (STEP 450). In particular, according to an embodiment, when a client application attempts to access the web application, the user of the client application may be authenticated. For example, the user may be asked to provide some form of authentication credentials including a user identifier such as a user name and password through an interface presented through the client application or an email address and password, etc. Once the user is authenticated, a tenant associated with the user may be determined. This user identifier may be used in association with an authentication or directory service such as an OTDS or LDAP server to determine the tenant associated with the user.

Once the tenant associated with the request from the client application is determined, a user session associated with the client application can be established (STEP 460). Specifically, in one embodiment, a user session for that user and client application associated with the request can be established at the web services application. The user session may also include, or be associated with, the tenant identified for the user.

Additionally, a database connection object may be established and associated with the established user session (STEP 470). The database connection object may be configured for accessing the particular instance of the schema in the database for the tenant associated with the user and client application. As the database connection object is associated with the corresponding user session for the user and client application, requests requiring access to the database received from that client application may be directed to the corresponding schema in the database using that database connection object for the user session. The database connection object may be created, for example, in a database connection layer of a web services platform on which the web services application resides.

At some point, the web services application may receive an object request (e.g., to create or store an object) (STEP 480). In particular, some of the requests submitted by the client application may involve the creation of, or access to, objects within the database, and specifically objects defined with respect to the schema defined in the database.

When the web application receives a request to store or create an object in the database from a client application the tenant associated with the object request may be identified (STEP 490). The identification of the tenant may be performed, for example, using an identifier associated with the user such as authentication credentials or an email address or another type of user identifier as discussed. The identification of the tenant may also be accomplished by referencing the user session associated with the client application from which the request was received which may include an identification of the tenant associated with the user and client application. In other words, according to certain embodiments the received request may be associated with an established user session and the tenant identified by the user session or otherwise associated with the user session can be determined.

An object identifier (objectid) for the object to be created or stored can then be determined based on the determined tenant (STEP 494). In one embodiment, the determined tenant can be used to determine the associated sequence range specific to the determined tenant and the next number in that sequence not yet assigned to an object determined. The objectid can thus include, or be based on or derived from, this next number in the sequence. For example, the objectid for the new object can be created by combining a reference to the database utilized by the web application and this determined sequence number. Other methods or algorithms or transformations for forming a unique objectid from a sequence number may be possible and are fully contemplated herein.

The object can then be created in the schema associated with the tenant in the database using the determined object identifier (STEP 498). Specifically, the received request can then be performed with respect to the schema associated with the determined tenant using database connection object associated with the user session 314 corresponding to the client application from which the request was received and the created objectid. For example, an object with the determine objectid may be created in the schema corresponding to the determined tenant.

Figure 5A:
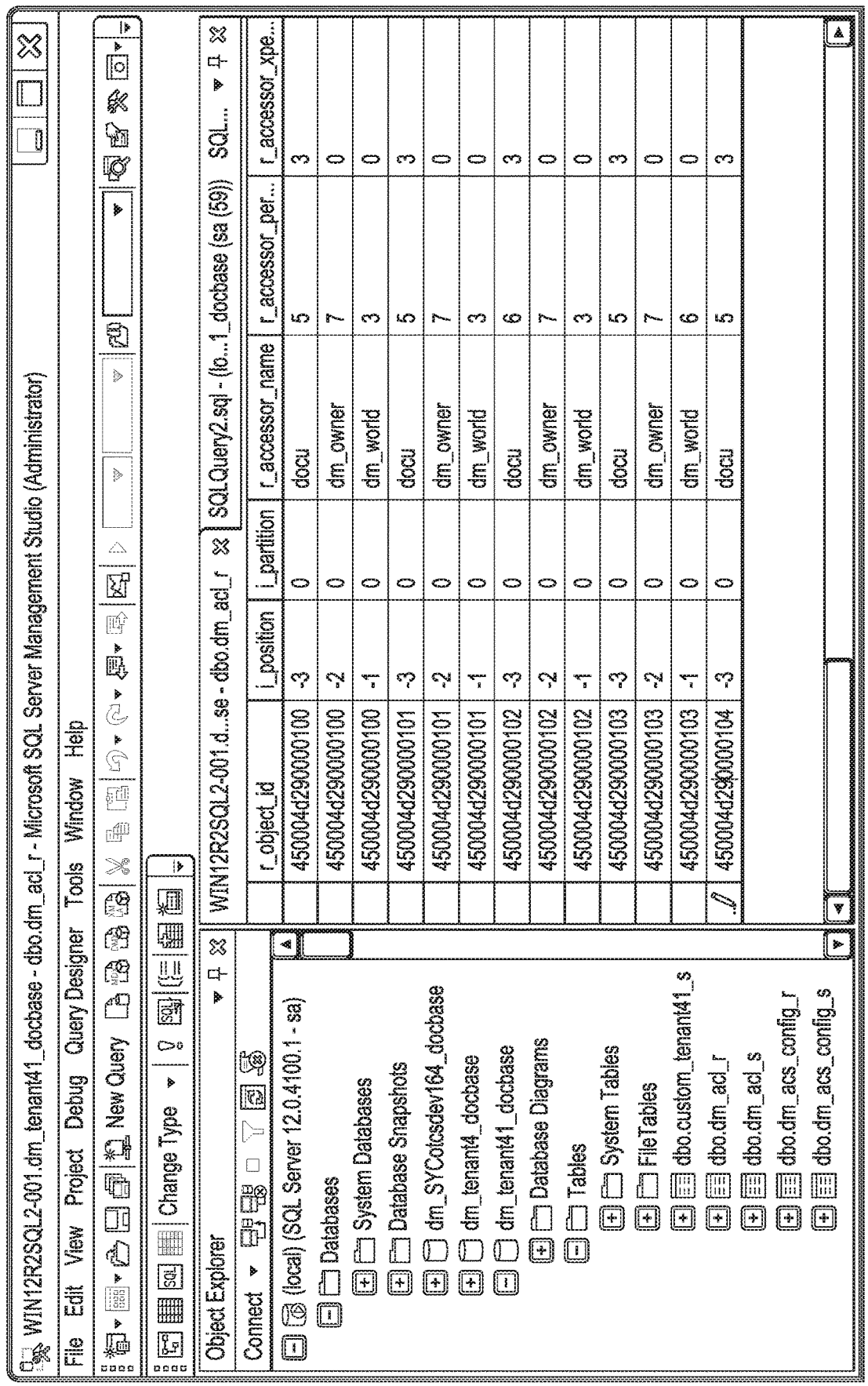
FIGS. 5A and 5B depict an example schema for two tenants.
Figure 5B:
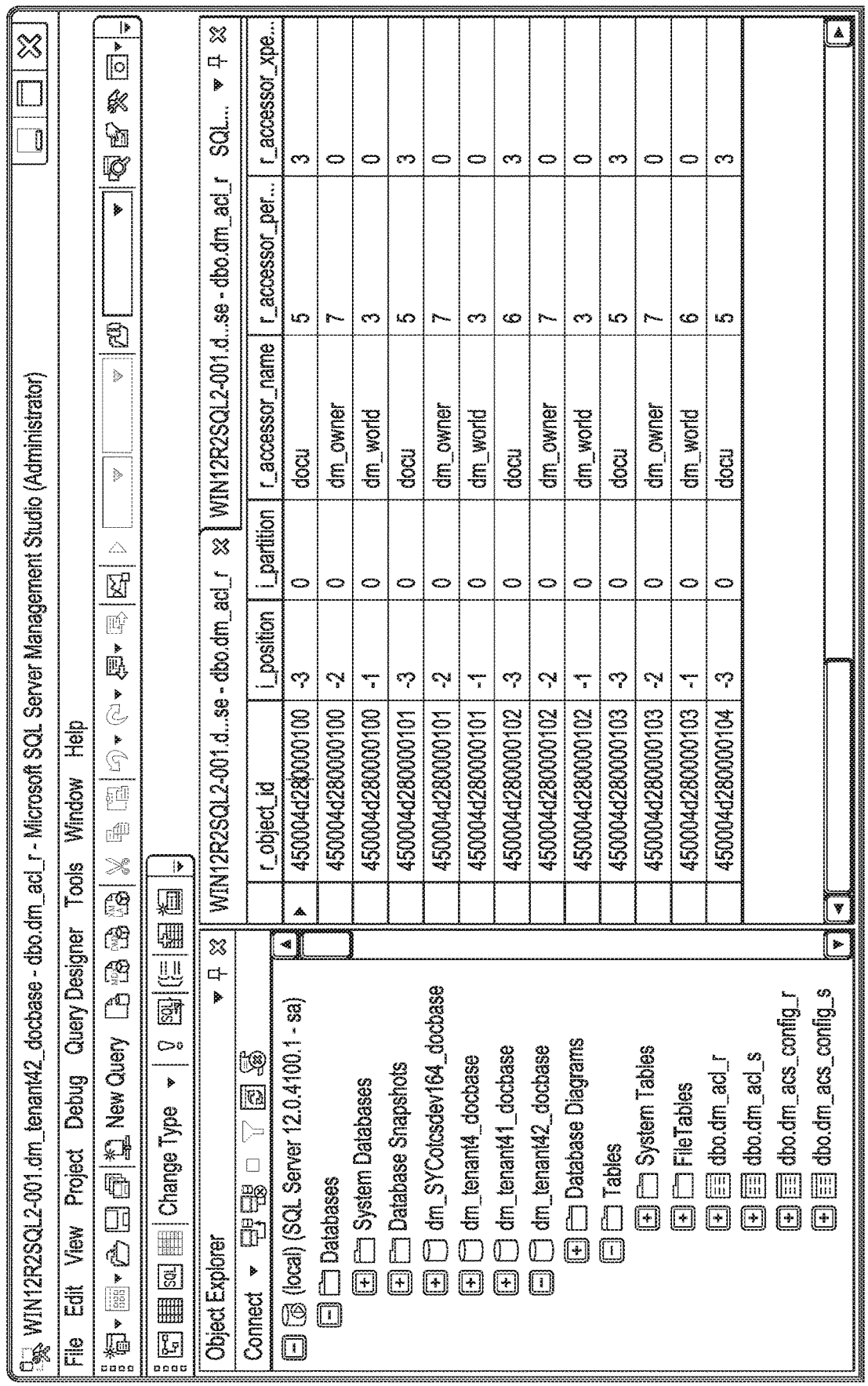

It is useful here to refer to FIGS. 5A and 5B which depict replicas of the same example schema for two different tenants. FIG. 5A depicts the schema for "dm_tenant41", where 'tenant41.png' shows the dm_acl_r table's rows of dm_tenant41_docbase schema. FIG. 5B depicts the schema for "dm_tenant41", where 'tenant42.png' shows the dm_acl_r table's rows of dm_tenant42_docbase schema.

In FIGS. 5A and 5B is can be seen that first 8 digits of r_object_id (the objectid for the example schema) are same and only the last 8 digits are changing. As discussed, r_object_id in this example is a hexadecimal number where the first two digits represents the object type (e.g., here a reference to the table itself), the next 6 digits represents docbase identifier and the last 8 digits represents the actual number of the object which is computed using the sequence range for the tenant. For example, in FIGS. 5A and 5B, in the first row, 45 represents the dm_acl type, 0004d2 represents docbase_id which is 1234 in decimal numbers and 80000100 represents the number of the object for dm_tenant42 (e.g., FIG. 5B) and for dm_tenant41 it is 9000100. With this range, each tenant can occupy a quarter billion objects in the schema.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. Accordingly, the scope of this disclosure should be determined by the following claims and their legal equivalents.

What is claimed is:

1. A web services system, comprising:
   a multitenant web services application deployed on a web services platform;
   a database layer, comprising a database;
   a non-transitory computer-readable medium, comprising instructions for:
   establishing a first schema in the database for a first tenant of the web services application;
   establishing a second schema in the database for a second tenant of the web services application, wherein the first schema is a replica of the second schema;
   in response to receiving a first request from a first user at a first client application:
   determining that the first request is associated with the first tenant;
   based on the determination that the first request is associated with the first tenant, establishing a first session at the web service application, the first session associated with the first client application;
   establishing a first database connection object configured to access the first schema of the database; and
   associating the first database connection object with the first session;
   in response to receiving a second request from a second user at a second client application:
   determining that the second request is associated with the second tenant;
   based on the determination that the second request is associated with the second tenant, establishing a second session at the web service application, the second session associated with the second client application;
   establishing a second database connection object configured to access the second schema of the database; and
   associating the second database connection object with the second session;
   receiving a third request at the web services application;
   determining if the third request is associated with the first tenant or the second tenant;
   based on a determination that the third request is associated with the first tenant, performing the third request by accessing the first schema in the database associated with the first tenant using the first session and first database connection object associated with the first schema; and
   based on a determination that the third request is associated with the second tenant, performing the third request by accessing the second schema in the database associated with the second tenant using the second session and second database connection object associated with the second schema.

2. The system of claim 1, wherein determining that the first request is associated with the first tenant comprises determining that the first user of the first client application is associated with the first tenant using user authentication credentials for the first user.

3. The system of claim 2, wherein the third request is a request to create an object and wherein the instructions are for:
   establishing a first range of sequence numbers associated with the first tenant and a second range of sequence numbers associated with the second tenant; and
   creating an object identifier for the object, where the object identifier includes a number in the first range of sequence numbers when it is determined that the third request is associated with the first tenant and the object identifier includes a number in the second range of sequence numbers when it is determined that the second request is associated with the second tenant.

4. The system of claim 3, wherein determining if the third request is associated with the first tenant or the second tenant is based on user credentials associated with the third request.

5. The system of claim 4, wherein the first user session includes a first identifier for the first tenant and the second user session includes a second identifier for the second tenant.

6. The system of claim 5, wherein determining if the third request is associated with the first tenant or the second tenant comprises associating the third request with the first user session or the second session.

7. A method, comprising:
establishing a first schema in a database for a first tenant of a multitenant web services application deployed on a web services platform;
establishing a second schema in the database for a second tenant of the web services application, wherein the first schema is a replica of the second schema;
in response to receiving a first request from a first user at a first client application:
determining that the first request is associated with the first tenant;
based on the determination that the first request is associated with the first tenant, establishing a first session at the web service application, the first session associated with the first client application;
establishing a first database connection object configured to access the first schema of the database; and
associating the first database connection object with the first session;
in response to receiving a second request from a second user at a second client application:
determining that the second request is associated with the second tenant;
based on the determination that the second request is associated with the second tenant, establishing a second session at the web service application, the second session associated with the second client application;
establishing a second database connection object configured to access the second schema of the database; and
associating the second database connection object with the second session;
receiving a third request at the web services application;
determining if the third request is associated with the first tenant or the second tenant;
based on a determination that the third request is associated with the first tenant, performing the third request by accessing the first schema in the database associated with the first tenant using the first session and first database connection object associated with the first schema; and
based on a determination that the third request is associated with the second tenant, performing the third request by accessing the second schema in the database associated with the second tenant using the second session and second database connection object associated with the second schema.

8. The method of claim 7, wherein determining that the first request is associated with the first tenant comprises determining that the first user of the first client application is associated with the first tenant using user authentication credentials for the first user.

9. The method of claim 8, wherein the third request is a request to create an object and wherein the method further comprises:
establishing a first range of sequence numbers associated with the first tenant and a second range of sequence numbers associated with the second tenant; and
creating an object identifier for the object, where the object identifier includes a number in the first range of sequence numbers when it is determined that the third request is associated with the first tenant and the object identifier includes a number in the second range of sequence numbers when it is determined that the second request is associated with the second tenant.

10. The method of claim 9, wherein determining if the third request is associated with the first tenant or the second tenant is based on user credentials associated with the third request.

11. The method of claim 10, wherein the first user session includes a first identifier for the first tenant and the second user session includes a second identifier for the second tenant.

12. The method of claim 11, wherein determining if the third request is associated with the first tenant or the second tenant comprises associating the third request with the first user session or the second session.

13. A non-transitory computer-readable medium comprising instructions for:
establishing a first schema in a database for a first tenant of a multitenant web services application deployed on a web services platform;
establishing a second schema in the database for a second tenant of the web services application, wherein the first schema is a replica of the second schema;
in response to receiving a first request from a first user at a first client application:
determining that the first request is associated with the first tenant;
based on the determination that the first request is associated with the first tenant, establishing a first session at the web service application, the first session associated with the first client application;
establishing a first database connection object configured to access the first schema of the database; and
associating the first database connection object with the first session;
in response to receiving a second request from a second user at a second client application:
determining that the second request is associated with the second tenant;
based on the determination that the second request is associated with the second tenant, establishing a second session at the web service application, the second session associated with the second client application;
establishing a second database connection object configured to access the second schema of the database; and
associating the second database connection object with the second session;
receiving a third request at the web services application;
determining if the third request is associated with the first tenant or the second tenant;
based on a determination that the third request is associated with the first tenant, performing the third request by accessing the first schema in the database associated with the first tenant using the first session and first database connection object associated with the first schema; and
based on a determination that the third request is associated with the second tenant, performing the third request by accessing the second schema in the database associated with the second tenant using the second session and second database connection object associated with the second schema.

14. The non-transitory computer-readable medium of claim 13, wherein determining that the first request is associated with the first tenant comprises determining that the first user of the first client application is associated with the first tenant using user authentication credentials for the first user.

15. The non-transitory computer-readable medium of claim 14, wherein the third request is a request to create an object and wherein the method further comprises:
  establishing a first range of sequence numbers associated with the first tenant and a second range of sequence numbers associated with the second tenant; and
  creating an object identifier for the object, where the object identifier includes a number in the first range of sequence numbers when it is determined that the third request is associated with the first tenant and the object identifier includes a number in the second range of sequence numbers when it is determined that the second request is associated with the second tenant.

16. The non-transitory computer-readable medium of claim 15, wherein determining if the third request is associated with the first tenant or the second tenant is based on user credentials associated with the third request.

17. The non-transitory computer-readable medium of claim 16, wherein the first user session includes a first identifier for the first tenant and the second user session includes a second identifier for the second tenant.

18. The non-transitory computer-readable medium of claim 17, wherein determining if the third request is associated with the first tenant or the second tenant comprises associating the third request with the first user session or the second session.

* * * * *